United States Patent
Pan

(10) Patent No.: US 7,602,335 B2
(45) Date of Patent: Oct. 13, 2009

(54) GEO-LOCATION USING DISTRIBUTED COMPOSITE GPS SIGNALS

(75) Inventor: Vic Pan, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/770,955

(22) Filed: Jun. 29, 2007

(65) Prior Publication Data

US 2008/0117101 A1    May 22, 2008

Related U.S. Application Data

(60) Provisional application No. 60/859,610, filed on Nov. 17, 2006.

(51) Int. Cl.
*H04B 7/185* (2006.01)
(52) U.S. Cl. ............................................ 342/357.09
(58) Field of Classification Search ............ 342/357.09, 342/357.08, 357.1, 357.06
See application file for complete search history.

(56) References Cited

U.S. PATENT DOCUMENTS

| | | | | |
|---|---|---|---|---|
| RE35,498 E | * | 4/1997 | Barnard | 342/357.09 |
| 5,625,668 A | * | 4/1997 | Loomis et al. | 342/357.1 |
| 5,812,086 A | * | 9/1998 | Bertiger et al. | 342/357.06 |
| 5,931,889 A | * | 8/1999 | Misra | 342/358 |
| 5,945,944 A | * | 8/1999 | Krasner | 342/357.1 |
| 6,104,338 A | * | 8/2000 | Krasner | 342/357.06 |
| 6,201,497 B1 | * | 3/2001 | Snyder et al. | 342/357.06 |
| 6,243,648 B1 | * | 6/2001 | Kilfeather et al. | 701/213 |
| 2001/0026240 A1 | * | 10/2001 | Neher | 342/357.07 |
| 2002/0038182 A1 | * | 3/2002 | Wong et al. | 701/213 |
| 2004/0110469 A1 | | 6/2004 | Judd et al. | |
| 2004/0143428 A1 | * | 7/2004 | Rappaport et al. | 703/22 |
| 2005/0242994 A1 | | 11/2005 | Cobb et al. | |

FOREIGN PATENT DOCUMENTS

| | | | |
|---|---|---|---|
| GB | 2353648 A | | 2/2001 |
| GB | 2380343 A | * | 4/2003 |
| WO | 9956143 | | 11/1999 |
| WO | 2004081600 A1 | | 9/2004 |

OTHER PUBLICATIONS

International Search Report and Written Opinion of the International Searching Authority for International application No. PCT/US2007/023692 mailed Jun. 6, 2008.

\* cited by examiner

*Primary Examiner*—Thomas H Tarcza
*Assistant Examiner*—Fred H Mull

(57) ABSTRACT

A wireless communication arrangement provides GPS coverage in areas where GPS satellites or macrocells are not directly detectable by a mobile station that is used for placing an emergency call. A detector detects a plurality of GPS satellites and provides a composite GPS signal that is re-radiated through a distributed antenna system to provide GPS signal coverage within a selected area such as inside of a building. The signal reach at each re-radiator assembly is individually controlled to keep the composite GPS signal coverage area within a selected limit. A mobile station used to place an emergency call reports the composite GPS signal information in a data call or SMS message that is associated with the emergency voice call. That information is then used for GEO-location to determine the location of the mobile station. A disclosed example includes a technique for addressing a scenario where a mobile station directly detects a satellite and detects the composite GPS signal.

5 Claims, 2 Drawing Sheets

GEO-LOCATION USING DISTRIBUTED COMPOSITE GPS SIGNALS

CROSS REFERENCE TO RELATED APPLICATIONS

This application claims priority to U.S. Provisional Application No. 60/859,610 which was filed on Nov. 17, 2006.

FIELD OF THE INVENTION

This invention generally relates to communication. More particularly, this invention relates to wireless communications.

DESCRIPTION OF THE RELATED ART

Wireless communications are widely used for a variety of purposes such as voice calls and data calls. One limitation on wireless communications has been the ability to respond to emergency request calls (e.g., 911 or 112 calls) made from a mobile station when a mobile station is in a location that cannot be easily identified. Locating the mobile station is necessary to provide an appropriate response to such an emergency call.

There are two generic geo-location approaches that are used for responding to emergency calls. Both approaches are based upon "triangulation" and rely upon the ability of a mobile station to receive radio frequency signals and measure the radio frequency propagation times from multiple macrocells or from multiple overhead satellites. There are several different satellite systems developed for navigation and timing. The most famous of these is the US Navstar GPS and the Russian GLONASS GPS systems. There are others being planned such as Galileo (European), INRSS (Indian), or Beidou (Chinese) systems. GPS refers to any of these satellite systems. Triangulation computations are performed using the estimated ranges as input parameter values to determine the location of the mobile station. There are variations on these triangulation approaches that depend upon the cellular technology, the positions of macrocells or satellites and the mobile station's computation capabilities.

The accuracy of known approaches depends upon three major factors: first, the mobile station's ability to receive RF signals from at least three or four transmitting devices (macrocell or satellite); second, the triangulation distances between transmitting and receiving devices; and third, timing accuracy and synchronization.

In the case of macrocell triangulation, larger cell radii diminishes a mobile station's ability to receive signals from multiple macrocells. In rural areas, for example, there may not be a sufficient number of macrocells that can be seen by a mobile station such that macrocell-based triangulation is not possible. In urban and suburban areas, RF blockages can prevent other macrocells from being seen by a mobile station, which renders macrocell triangulation ineffective. Triangulation over macrocell distances is inherently less accurate compared to satellite triangulation, which makes timing accuracy and synchronization far more critical. With base station technologies that do not sufficiently synchronize timing among base stations such as GSM or UMTS, global positioning system (GPS) information is used to track how far off each base station clock is and "timing correction" messages are periodically broadcasted to mobile stations so that they can correct their range estimates. Because small timing errors create large GEO-location errors especially over short triangulation distances, these timing corrections are sent frequently and this creates a significant traffic load between a base station and a GPS timer and between the GPS timer and a mobile station.

GPS GEO-location (satellite based) is inherently much more accurate than macrocell triangulation. With GPS triangulation, there must be at least four overhead satellites seen by a mobile station (i.e., three satellites used for X, Y, Z positioning and a fourth for mobile station timing offset information). In the case of GPS, satellite orbits have been designed such that there are six earth orbits each populated with four non-GEO synchronized satellites providing between six and eleven overhead satellites visible in a clear sky at all times. Nonetheless, it is possible that a mobile station will not see at least four satellites when RF blockages prevent satellite reception, for example. The situation can arise, for example, when the mobile station is within a deep urban cannon such as the streets of Manhattan. Skyscrapers and other structures tend to block the mobile station's view of the sky. When a mobile station's view of the sky is not diminished or restricted, GPS triangulation accuracy is useful.

Timing synchronization is not a problem with GPS triangulation because each of the satellites is equipped with an atomic clock and ground communications continuously monitor clock accuracy to provide extremely accurate satellite timing synchronization. The need for a highly accurate mobile station clock is avoided by using a fourth satellite range measurement.

GPS based GEO-location approaches have a unique problem in meeting the Federal Communication Commission requirement in the United States to GEO-locate an emergency call within thirty seconds. A mobile station, upon power up, may take as long as fifteen minutes to locate the satellites necessary for GPS location. Much of this time is spent transmitting satellite almanac data over a fifty BPS data channel. Assisted GPS (AGPS) provides the mobile station with dynamic satellite positioning data over a high speed communications channel to meet the FCC's thirty second positioning requirement. Of course, not all emergency calls are made by first turning on a mobile station. When a call is made from an already turned on mobile station, the satellites are already acquired. In such an instance, the call and GEO-location commence immediately.

Chipset manufacturers and handset manufacturers are moving toward GPS for emergency call GEO-location. Commercially available GPS chip sets are designed to work in GSM and UMTS handsets in terminals that support HSDPA, GPRS and EDGE. GPS receivers are part of CDMA 2000 technologies and are included in CDMA handsets and similar devices. GPS based GEO-location appears to be an emerging dominant technical approach for emergency call GEO-location.

While there have been great difficulties in meeting requirements for locating emergency calls from mobile stations outdoors, the GEO-location problem inside of buildings is even more formidable. The major stumbling block is that the building itself tends to block macrocell and satellite signals that are otherwise available outside of the building. Inside a building, none of the known GEO-location triangulation methods work when the macrocell and satellite signals are not available in the building. At best, GEO-location triangulation might be possible by placing a call from a position near a window perhaps on an upper floor where there might be sufficient signal strength to "see" the required number of macrocells or satellites to perform traditional GEO-location. Even still, this is not generally possible by all windows in a building. Moreover, anywhere near the center of a building typically results in no receivable GPS signals. Even buildings that have a distributed antenna system (DAS) for distributing cellular base station signals for making calls within a building do not provide triangulation signals that are useful for GEO-location. Essentially most of the area inside most buildings where it may be possible for someone to place an emergency call using a mobile station are areas where existing triangulation GEO-location methods will not work.

SUMMARY

An exemplary method of facilitating an emergency call from a mobile station includes detecting global positioning system (GPS) satellites with a detector. A composite GPS signal is generated based on the detected satellites. The composite GPS signal is distributed at a plurality of locations within a selected area (e.g., within a building). An amount of power of the distributed GPS signal is controlled at each of the locations where the composite GPS signal is distributed.

Another exemplary method is for handling an emergency call from a mobile station. An emergency call is received from a mobile station in a location where the mobile station does not directly detect enough GPS satellites or macrocells to provide location information. An indication of at least a composite GPS signal is received from the mobile station. The composite GPS signal is detected by the mobile station at the location. The composite GPS signal is based on information regarding GPS signal sources. The location of the mobile station is determined from the received indication.

Another exemplary method of communicating includes placing an emergency call from a location where it is not possible to directly detect a plurality of GPS satellites or macrocells. A composite GPS signal is detected that is based on timing information regarding a plurality of GPS satellites. An indication of the detected composite GPS signal is provided in association with the placed emergency call.

The various features and advantages of the disclosed examples will become apparent to those skilled in the art from the following detailed description. The drawings that accompany the detailed description can be briefly described as follows.

DETAILED DESCRIPTION

Figure 1:
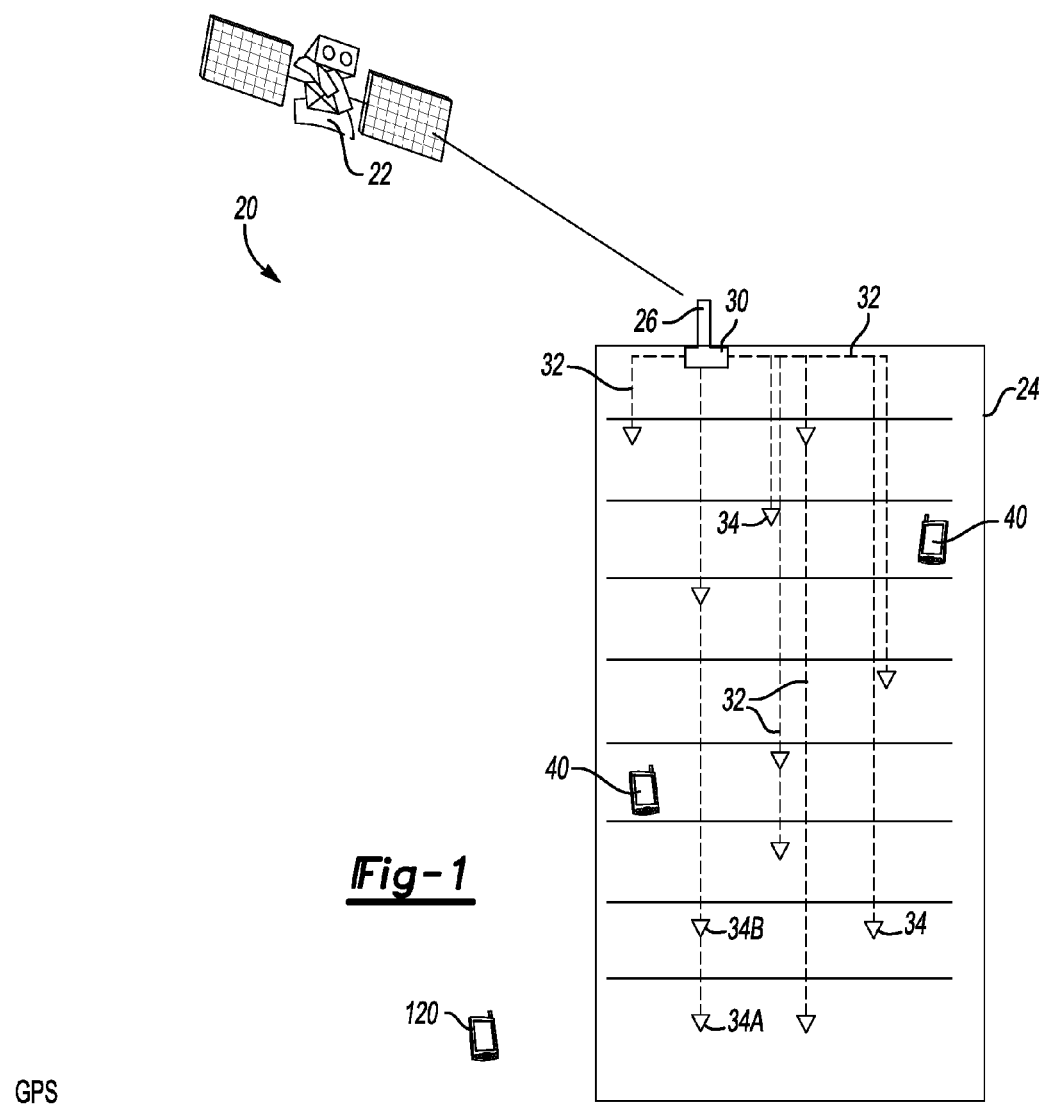
FIG. 1 schematically illustrates selected portions of a communication system that is useful for locating mobile stations placing emergency calls.

FIG. 1 schematically illustrates a communication system 20 that utilizes global positioning system (GPS) satellites 22 for GEO-location information. Only one example satellite 22 is shown in the illustration. Signals from the satellites 22 may not be directly detectable in certain areas such as within a building 24. While a building is used as an example area within which direct detection of GPS satellite signals may not be sufficiently available for GEO-location purposes, this invention may not necessarily be limited to in-building arrangements. Those skilled in the art who have the benefit of this description will realize in what contexts the disclosed example techniques may be useful.

The example of FIG. 1 includes a rooftop antenna that is part of a detector 26 that is positioned to directly detect signals from a plurality of GPS satellites 22. The detector 26 is strategically positioned to obtain a full view of as many GPS satellites 22 as possible in the sky. The sum of all satellite signals detected by the detector 26 is referred to as a composite GPS satellite signal. Those skilled in the art who have the benefit of this description will realize how to generate a composite GPS signal in a format that meets their particular needs.

The example of FIG. 1 includes a repeater 30 that amplifies and repeats the received composite GPS signal. The repeater 30 is useful for distributing the composite GPS signal over a distributed antenna system (DAS) within the building 24. In this example, a plurality of RF cables 32 and splitters distribute the composite GPS signal at a plurality of locations within the building 24 using GPS re-radiator assemblies 34. In the illustrated example, a power boost provided by the repeater 30 provides GPS satellite RF coverage inside the building 24 through the DAS re-radiator assemblies 34 overlaying inside cellular RF coverage.

The illustrated example includes the ability to control an amount of amplification at each of the re-radiator assemblies 34 to control the extent of the transmission of the composite GPS signal at each location of a re-radiator assembly 34. Re-radiation of GPS signals has been limited, in part, to avoid GPS interference between a re-radiated signal and a directly detectable GPS satellite signal. If a re-radiated GPS signal mixes directly with a received satellite signal, that produces interference. By controlling amplification at each of the re-radiator assemblies 34, the reach of the distributed composite GPS signal can be customized depending on the needs at a particular location.

The GPS re-radiator assemblies 34 allow mobile stations 40 within the building 24 to provide GEO-location information based upon the distributed composite GPS signal that the mobile station 40 detects from a nearby located re-radiator assembly 34.

Figure 2:
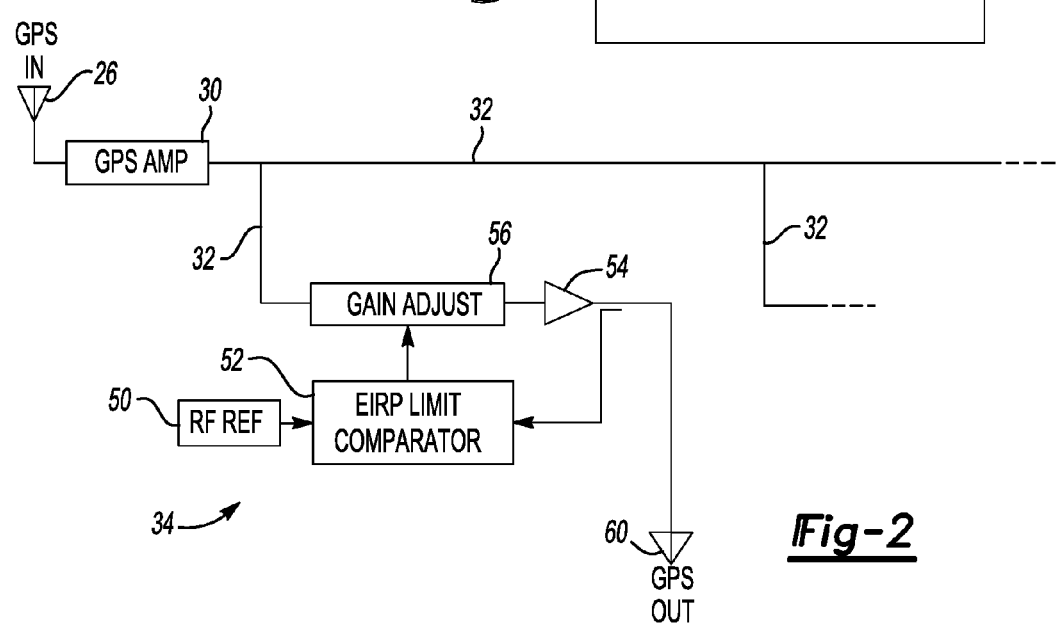
FIG. 2 schematically illustrates an example arrangement for controlling amplification of a distributed composite GPS signal in one example embodiment.

FIG. 2 schematically illustrates one example arrangement that provides control over the effective isotropic radiated power (EIRP) of each GPS re-radiator assembly 34. In the example of FIG. 2, an RF reference 50 is provided to an EIRP limit comparator 52. An output from an amplifier 54 is compared with the RF reference 50 for purposes of controlling a gain adjuster 56 to control the radiated power from an antenna 60 of the re-radiator assembly 34. Given this description, those skilled in the art will be able to select appropriate components for configuring a GPS re-radiator assembly to meet their particular needs while providing the ability to customize the EIRP at each location where the composite UPS signal is distributed for purposes of avoiding GPS interference and to provide a desired coverage area within which the distributed composite GPS signal is available.

Providing customized control at each GPS re-radiator assembly 34 accommodates the fact that within a network of cables 32 and splitters (e.g., within the example DAS of FIG. 1), the boosted RF power levels can vary by 10's of dB. Customizing the amplification at each location where the composite GPS signal is distributed limits the EIRP of the re-radiated composite GPS signal to protect against GPS interference, for example. Additionally, providing an arrangement such as that shown in FIG. 2 allows for placing a GPS re-radiator assembly 34 anywhere within the building 24 by making an appropriate connection to the DAS because the customized amplification can be set to address different power levels along the DAS.

Appropriate selection of power thresholds applied by the gain adjuster 56 controls the reach of the distributed composite GPS signal, which can be limited to as little as 10's of feet. At received power levels of −130 dBm, there is little danger of interfering with other uses of the spectrum. A selected power threshold will depend on the needs of a particular situation at a particular location.

In some instances, it is desirable to limit the amount of coverage provided by the re-radiator assemblies 34 to avoid GPS RF leakage outside of a building, for example. As mentioned above, with the example re-radiator assemblies 34, the RF reach of a transmitting GPS antenna can readily be limited to fifty feet and kept inside of a building regardless of where it is attached to the DAS. Additionally, building exit losses reduce any leakage outside of the building on the order of 20 dB (10 dB exiting the building and 10 dB entering the building). Additionally, using inwardly facing directional antennas exploits the antenna front-to-back ratio loss and adds additional leakage loss of 20-25 dB. With the disclosed example, it is possible to tightly control and restrict the amount of re-radiated RF leakage.

For example, on the upper floors of the building 24, even if there is RF leakage about fifty feet outside of the window, that may be of no consequence because there will be no mobile stations at that location. If there are adjacent buildings, those buildings will block the re-radiated composite GPS signal in much the same manner that the buildings would block direct GPS satellite signals.

At street level, GPS RF leakage inside and outside of the building might interfere with GEO-location of mobile stations. Suppose four or more GPS satellites are detectable on the street. In this situation, those signals could be re-radiated inside the lower levels of nearby buildings using an appropriate DAS coupled with another antenna at street level. Any additional delay introduced by such a DAS introduces negligible positioning error because the delays are much smaller than a microsecond in most cases. Such street level GPS signals might even be re-radiated on a second floor of the building. In such an example, the antenna 26 located on a building rooftop can be used as the GPS composite signal source for the rest of the interior of the building.

There will be situations, however, where there is not adequate GPS coverage on a street level such that a mobile station 120 (FIG. 1) may not be locatable for purposes of responding to an emergency call placed from that mobile station if only traditional GEO-location strategies are used. The situation may arise, for example, in an urban canyon where there are surrounding skyscrapers. For this situation, re-radiated GPS leakage from inside the building 24 to the outside can actually provide the ability for GEO-location where it did not previously exist. In the illustrated example, the re-radiator assemblies 34A and 34B are configured to extend the coverage provided by the composite GPS signal available through the antenna 26 outside of the building 24 and onto the street level where the mobile station 120 is located, for example. In one example, the re-radiated composite GPS signal is allowed to leak as far as fifty feet outside of the building 24. This will allow for the mobile station 120 to be GEO-located using the distributed composite GPS signal. In most such cases, the mobile station 120 will be located as if it were at the address of the building 24 where the detector 26 is placed. While the caller is not actually in the building, the close proximity to the building is within governmental regulations for GEO-location accuracy requirements.

Accordingly, the illustrated example is useful for limiting re-radiated GPS signal coverage or extending re-radiated GPS signal coverage, depending on the needs at a particular location. For example, the amplification at one of the re-radiator assemblies may be decreased to restrict the coverage area of the re-radiated composite GPS signal at that location. Another one of the re-radiator assemblies (e.g., 34A or 34B) has an increased amplification to extend the coverage of the composite GPS signal so that it reaches up to a desired range.

The disclosed techniques are also useful for providing GPS signal coverage within small buildings such as small office, home office (SOHO) residences. By keeping DAS delay limits low, the composite GPS signal reception scenario introduces negligible GEO-location error. The example re-radiator assemblies 34 can be used to provide SOHO or residential cellular and GEO-location GPS RF coverage.

Figure 3:
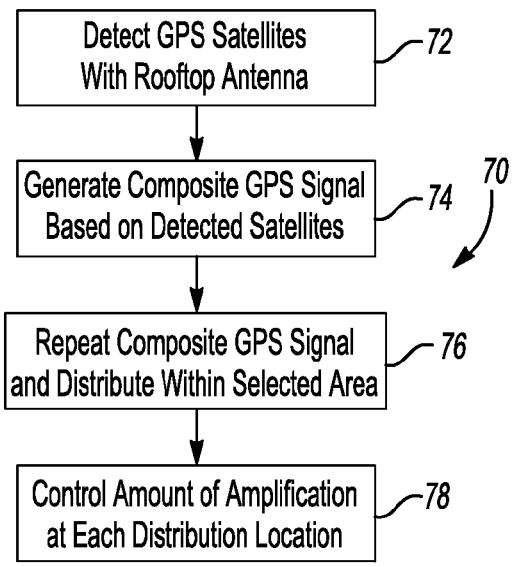
FIG. 3 is a flowchart diagram summarizing one example approach.

FIG. 3 includes a flow chart diagram 70 summarizing an example approach. At 72, the GPS satellites are detected (e.g., using the rooftop antenna 26). A composite GPS signal is generated based on the detected satellites at 74. The repeater 30 is used to repeat the composite GPS signal. The DAS 32 and re-radiator assemblies 34 are used to distribute the composite GPS signal within the selected area (e.g., within the building 24) as shown at 76. At 78, the amount of amplification at each distribution location is controlled for the purposes mentioned above.

Figure 4:
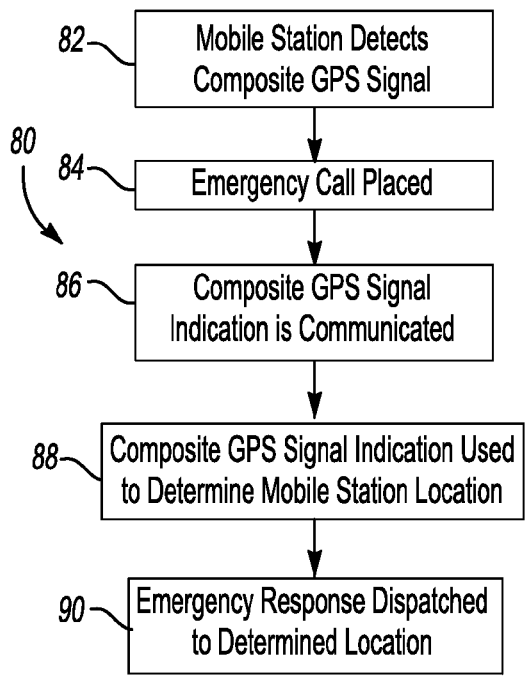
FIG. 4 is a flowchart diagram summarizing another example approach.

FIG. 4 includes a flowchart diagram 80 summarizing an example emergency call scenario. At 82, a mobile station 40 detects the distributed composite GPS signal that is provided by a nearby GPS re-radiator assembly 34. At 84, the mobile station 40 is used to place an emergency call (e.g., an individual dials 911 from the mobile station 40). A composite GPS signal indication is communicated from the mobile station 40 in association with the voice call to the emergency number. This is shown at 86.

Providing a composite GPS signal indication occurs in one example by making a simultaneous data call from the mobile station 40. In another example, the composite GPS signal indication is provided by sending a short message service (SMS) message from the mobile station 40. An assisted GPS (AGPS) server receives the indication of the composite GPS signal. In one example, the AGPS server is connected to a serving base station through an internet connection or a direct facility connection.

At 88, the composite GPS signal indication is used by the AGPS server to determine the location of the mobile station 40. The location of the mobile station may be reported as the address of the building 24 upon which the detector 26 (e.g., an antenna) is supported and from which the composite GPS signal is derived.

In one example, an AGPS server includes a database having building address information corresponding to longitude and latitude information that can be determined from the composite GPS signal indication. In one example, the AGPS server determines whether the computed longitude and latitude based on the received composite GPS signal indication falls within the rooftop limits of a building in the database. If so, the AGPS server reports the building address, the determined longitude and latitude or both as the location of the mobile station 40. In the event that no building address matches or corresponds to the determined longitude and latitude, the AGPS server will report the computed longitude and latitude.

As shown at 90 in FIG. 4, an emergency response is dispatched to the determined location. The AGPS server, cellular base station or both report information regarding the emergency call and the location of the mobile station to an appropriate entity that can respond to the emergency call. A known technique for contacting a public safety answering point (PSAP) is used in one example.

The above-described scenario works with any mobile station 40 that has rudimentary GPS pseudo range measurement capabilities and the capability to make a data call or generate a text message. AGPS eliminates the need for the mobile station 40 to perform the GEO-location computations. Accordingly, the example approach is useful for locating a mobile station 40 that is equipped with a GPS receiver chip set. Macrocell timing synchronization or synchronization timing corrections are not required with the disclosed example. The data call or text message that reports the pseudo range measurements based upon the detected distributed composite GPS signal can be accomplished by any data or messaging technology existing on the mobile station. For example, SMS on GSM, GPRS, EDGE, UMTS, HSDPA, CDMA 2000, CDMA 2000 1X, CDMA EVDO or WiMax can be used.

There will be some situations or locations within a building where the just-described example will not provide sufficiently accurate location information for purposes of locating the mobile station. For example, if the mobile station 40 is near a window on an upper floor, the mobile station 40 may directly receive satellite signals through the window. If the mobile station 40 also receives the composite GPS signal from a re-radiator assembly 34, there is an effective mixing of GPS signaling information. In the "mixed" scenario, all of the satellite RF propagation time differential delays are not retained. The satellite signals received through the antenna of the detector 26 may be delayed compared to a directly detected satellite on the order of a microsecond because of the extra delays of the DAS cables 32, splitters and the GPS repeater 30. Such delay differences introduce GEO-location errors. Such errors do not make it possible to reliably GEO-locate a mobile station using standard GEO-location algorithms.

Figure 5:
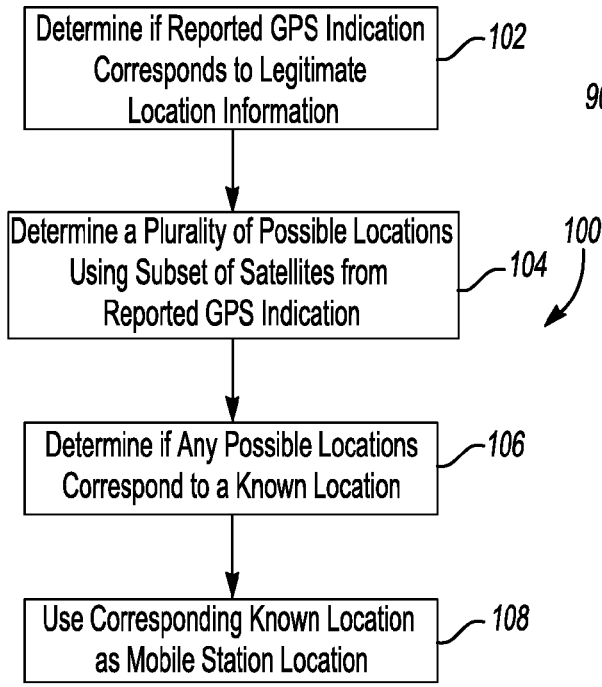
FIG. 5 is a flowchart diagram summarizing another example approach.

FIG. 5 includes a flowchart diagram 100 that summarizes an example approach for compensating for such a "mixed" scenario. In FIG. 5 at 102, a determination is made whether the reported GPS indication from a mobile station corresponds to legitimate location information. At 104, a plurality of possible locations are determined using subsets of satellites from the recorded GPS indication. At 106 a determination is made whether any of the possible locations corresponds to a known location (e.g., a legitimate longitude and latitude or a known building address). A 108, any such known location is used as the mobile station location for purposes of reporting that location to an emergency response entity.

The approach of FIG. 5 is useful for mixed scenario conditions and it takes advantage of the fact that a dedicated GPS antenna such as the rooftop antenna 26 (FIG. 1) has a much better view of the sky than a mobile station would at street level or near a window within a building. In general, between six and eleven GPS satellites are visible in the sky at all times with an average of eight being available when there is a full view of the sky. Near a window within a building there is a restricted view of the sky (e.g., perhaps one-half to one-quarter of the view of the sky compared to the roof) and in some cases even near a window no satellites are visible because of adjacent buildings.

In one example, the re-radiated composite GPS signal levels are controlled so that near the windows of a building they are at least −130 dBm. This level corresponds to a typical GPS receiver sensitivity, for example. In this situation, a mobile station 40 could lock onto a direct satellite visible through the window or the composite GPS signal available through a re-radiator assembly 34 within the building 24 provided that both signals are above the mobile station GPS receiver threshold. Once a mobile station locks onto a satellite, it does not continue the correlation process to look elsewhere for that satellite. When a mobile station is near a window, that does not automatically mean that the directly visible satellite will be locked onto. In many cases, a mobile will lock onto the satellites through the composite GPS signal and it will be reliably GEO-located as described above.

In some circumstances, a mobile station will lock onto a directly detectable satellite and lock onto other satellites that are effectively viewable through the distributed composite GPS signal. In such a situation, there will be between six and eleven GPS satellites whose pseudo ranges will be estimated by the mobile station and reported to the AGPS server as described above. Because of the mixed signal scenario, the time delays introduced by the DAS have an effect and introduce error. If only the composite GPS signal is detected by the mobile station, the delay for all of the satellites in the composite GPS signal is the same and they have no effect in determining the longitude and latitude of the mobile station rotation. In the case of a mixed scenario, the directly detectable satellite does not include such a delay and, therefore, the introduced error must be accommodated.

In one example, the step 104 of FIG. 4 includes using all possible combinations of four pseudo range measurements from the satellites at the AGPS server. In this example, the AGPS server attempts to find a longitude and latitude building match for all of the combinations that it computes. If any one of these longitude and latitude answers corresponds to the rooftop of a building, that building is identified as the location of the mobile station and the building address, computed longitude and latitude or both are reported to the PSAP.

Using combinations of four pseudo range measurements provides the ability to accurately GEO-locate the mobile station 40 under a mixed scenario under most conceivable conditions. For example, if only six satellites are visible to the antenna 26 and two satellites are visible directly to the mobile station 40 near a window, there will be four satellite indications within the reported GPS information that are useful for properly GEO-locating the mobile station (e.g., only two will have error-causing delays introduced by the DAS). When more satellites are visible to the antenna of the detector 26, even more of the satellites can be used for appropriate GEO-location. Using a combinatorial computational approach takes advantage of the fact that an antenna placed on a rooftop will detect more satellites than any mobile station antenna located near a window or even outside of a building at street level in the case of an urban canyon. On average, eight satellites will be seen by a rooftop antenna under most circumstances. There will be generally enough satellites seen through a rooftop antenna so that at least one of the combinations of four pseudo range measurements results in finding the position of the rooftop antenna and, consequently, the location of the mobile station.

Another example does not limit the computational combination to calculations of four pseudo range measurements at one time. GEO-location computations are more accurate when more satellites are considered. One example approach includes successively eliminating one of the satellites from the computation and using each such subset for attempting to determine the longitude and latitude information. After each combination or subset that includes all but one of the satellites has been processed and there still is not a sufficiently reliable GEO-location answer, further subsets are formed by removing two of the satellites from consideration and processing each possible combination. This process can continue until the mobile station is located.

For example, assume that eleven satellites are visible from the rooftop antenna of the detector 26 and at least one is directly detectable through a window at the time of an emergency call. GEO-location computations are first made using all eleven satellites. If the mobile station 40 directly detected at least one of those satellites, there will be computation errors. Consequently, GEO-location will not be complete. All combinations of ten of the eleven satellites are then used with the pseudo range satellite measurement of one of the satellites being removed from each such subset. If a satisfactory answer is not obtained from those subsets, all combinations of nine pseudo range satellite measurements are used. This is then followed with combinations of eight, seven, six, etc. In one example, once any one of the longitude and latitude answers from any one of the subsets under consideration corresponds to the rooftop of a building within the AGPS server database, that building is identified as the location of the mobile station 40. In another example, two subsets produce the same result before that result is reported as the mobile station location.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of handling an emergency call from a mobile station, comprising:
    receiving an emergency call from a mobile station in a location where the mobile station does not directly detect enough global positioning system (GPS) satellites or enough macrocells to provide location information;
    receiving an indication of at least a composite GPS signal that was detected by the mobile station at the location, the composite OPS signal being based on information regarding GPS satellites, wherein the received indication is based on a number of satellites; and
    determining the location of the mobile station from the received indication by
    determining whether the received indication provides sufficient information for locating the mobile station;
    determining possible mobile station locations from information regarding each of a plurality of subcombinations of the number of satellites; and
    selecting one of the possible mobile station locations that corresponds to a known location as the location of the mobile station.

2. The method of claim 1, comprising
    removing one of the number of satellites from consideration to establish a first subset of the satellites during one attempt at determining the possible mobile station locations; and
    subsequently removing a different one of the number of satellites from consideration to establish a next subset of satellites during another attempt at determining the possible mobile station locations.

3. The method of claim 2, comprising
    performing the subsequently removing until one of the following is achieved
    i) each of the number of satellites has been removed from consideration; or
    ii) a possible mobile station location that corresponds to an identifiable location is obtained.

4. The method of claim 3, comprising
    using the obtained possible mobile station location as the determined location of the mobile station.

5. The method of claim 3, comprising
    sequentially removing an increasing plurality of the number of satellites from consideration to establish additional subsets of satellites for determining the possible mobile station location; and
    continuing the sequentially removing and considering until a possible mobile station location that corresponds to an identifiable location is obtained.

* * * * *